(12) United States Patent
Jiang et al.

(10) Patent No.: US 12,122,534 B2
(45) Date of Patent: Oct. 22, 2024

(54) DIRECT DESIGN METHOD FOR GENERATING OSCULATING CURVED WAVE-RIDER BASED ON COMPLEX LEADING-EDGE PROFILE

(71) Applicant: BEIHANG UNIVERSITY, Beijing (CN)

(72) Inventors: Chongwen Jiang, Beijing (CN); Zhihao Li, Beijing (CN); Shuyao Hu, Beijing (CN); Chenhao Xu, Beijing (CN); Zhenxun Gao, Beijing (CN); Chunhian Lee, Beijing (CN)

(73) Assignee: BEIHANG UNIVERSITY

( * ) Notice: Subject to any disclaimer, the term of this patent is extended or adjusted under 35 U.S.C. 154(b) by 0 days.

(21) Appl. No.: 17/908,895

(22) PCT Filed: Sep. 7, 2021

(86) PCT No.: PCT/CN2021/116851
§ 371 (c)(1),
(2) Date: Sep. 1, 2022

(87) PCT Pub. No.: WO2022/247050
PCT Pub. Date: Dec. 1, 2022

(65) Prior Publication Data
US 2024/0199229 A1 Jun. 20, 2024

(30) Foreign Application Priority Data
May 24, 2021 (CN) .......................... 202110564755.4

(51) Int. Cl.
*B64F 5/00* (2017.01)

(52) U.S. Cl.
CPC ..................................... *B64F 5/00* (2013.01)

(58) Field of Classification Search
CPC ....................................................... B64F 5/00
See application file for complete search history.

(56) References Cited

U.S. PATENT DOCUMENTS

| | | | | |
|---|---|---|---|---|
| 6,634,594 B1 * | 10/2003 | Bowcutt | ................... | B64C 3/10 244/36 |
| 7,461,820 B2 * | 12/2008 | Grove | ....................... | B64C 3/48 416/240 |
| 7,866,599 B2 * | 1/2011 | Elvin | ...................... | B64C 30/00 244/53 B |
| 8,256,706 B1 * | 9/2012 | Smith | ................... | B64D 33/02 137/15.1 |

(Continued)

*Primary Examiner* — Tye William Abell
(74) *Attorney, Agent, or Firm* — Jose Cherson Weissbrot (57) ABSTRACT

A direct design method for generating an osculating curved waverider based on a complex leading edge, includes obtaining a leading edgeleading edge through determining a leading edge of a waverider according to a spread length, a front-to-rear length, and a sweep angle at each position of an aircraft, and arranging leading-edge discrete points on the leading edgeleading edge; drawing a small shock cone corresponding to each leading-edge discrete point by starting from each leading-edge discrete point, taking a local shock angle as a half cone angle and taking a free streamline direction as an axis; finding envelope surfaces of all small shock cones, namely, a shock curved surface corresponding to the leading edgeleading edge; generating a waverider by using the osculating curved waverider design method.

2 Claims, 5 Drawing Sheets

(56) References Cited

U.S. PATENT DOCUMENTS

| | | | | |
|---|---|---|---|---|
| 11,661,184 B2* | 5/2023 | Powell | ................... | B64C 3/38 244/130 |
| 2009/0302168 A1* | 12/2009 | Hetrick | ................... | B64C 3/48 74/25 |
| 2020/0283169 A1* | 9/2020 | Liu | ................... | G06F 30/15 |

* cited by examiner

DIRECT DESIGN METHOD FOR GENERATING OSCULATING CURVED WAVE-RIDER BASED ON COMPLEX LEADING-EDGE PROFILE

TECHNICAL FIELD

This invention generally relates to the technical field of aircraft design, and more particularly, to a direct design method for generating an osculating curved waverider based on a complex leading edge.

BACKGROUND

In hypersonic flight, the lift-drag ratio of a waverider is significantly higher than that of a conventional counterpart such as the wing-body combination or the lifting body. As a result, hypersonic aircrafts in research phases mainly adopt an aerodynamic configuration of waverider or quasi waverider.

Conventional methods for designing waveriders mainly comprise the wedge-derived method, the fixed/variable wedge-angle method, the cone-derived design method, the osculating cone method and the osculating inward turning cone method, etc. The aforesaid methods have certain features in common: when designing the waverider, two geometric elements including the shock surface (or inlet capture curve) and the flow capture tube need to be used as input variables, and the of the leading edge of a waverider can merely be used as an output variable.

Taking the osculating cone waverider design method as an example, in this method, two geometric elements including the inlet capture curve (ICC) and the flow capture tube (FCT) are used as design input variables. The normal plane corresponding to each point on the inlet capture curve (ICC) is obtained by calculating the curvature radius of each point on the inlet capture curve (ICC). A straight line is made from each point on the inlet capture curve (ICC) in the obtained normal plane, which forms a complement angle of the shock angle with the base plane, and then the straight line is extended forward until it intersects with the flow capture tube (FCT). The intersection point is a leading edge point of the waverider corresponding to this portion of shock wave. After connecting all the obtained leading edge points into a curve, a leading edgeleading edge is obtained.

It can be seen that, according to conventional waverider design methods, the leading edgeleading edge is obtained indirectly by means of the shock and the flow capture tube instead of being directly designed. Therefore, conventional waverider design methods should be defined as reverse design methods. The leading edge and the plane of the waverider obtained through adopting conventional reverse design methods normally depart from the original intention of design. In aircraft design, especially in hypersonic aircraft design, the leading edge and the plane are normally the key factors restricting the aerodynamic performance of an aircraft. Under such circumstances, a design method capable of generating a waverider based on a given leading edgeleading edge may significantly help to realize a precise control of the waverider, thereby achieving higher cruise lift-drag ratio while widening the application range of the designed waverider aircrafts.

Presently, some researchers have proposed a method for designing an osculating cone waverider based on a leading edge. Unfortunately, it is only compatible with the osculating cone design method, meaning that the waverider must be generated based on a simple leading edge with an increasing sweep angle. Some other researchers have improved the osculating cone waverider design method and proposed one capable of generating an osculating cone waverider based on a complex leading edgeleading edge. However, due to the limit of numerical method, it can only be solved numerically but not analytically, resulting in poor design accuracy. Moreover, in this method, the curvature of the leading edgeleading edge is totally irrelevant to the design of the waverider, needing to calculate the curvature of the shock curve again after calculating the shock curve. Therefore, it still possesses properties of a reverse design.

SUMMARY

The present invention provides a direct design method for generating an osculating curved waverider based on a complex leading edge. Moreover, the method of the present invention provides an analytical expression of the shock curved surface corresponding to the leading edgeleading edge, which effectively ensures the design accuracy of the waverider.

To achieve the above purpose, the present invention adopts the following technical solution:

A direct design method for generating an osculating curved waverider based on a complex leading edge, comprising the steps of:

Step 1: obtaining a leading edgeleading edge through determining a leading edge of a waverider according to the spread length, the front-to-rear length, and the sweep angle at each position of an aircraft, and arranging leading-edge discrete points on the leading edgeleading edge;

Step 2: drawing a small shock cone corresponding to each leading-edge discrete point by starting from each leading-edge discrete point, taking a local shock angle as a half cone angle and taking a free streamline direction as an axis;

Step 3: finding the envelope surfaces of all small shock cones 3, namely, the shock curved surface 7 corresponding to the leading edgeleading edge;

Step 4: generating a waverider by using the osculating curved waverider design method;

In another embodiment of the present invention, the method for obtaining the shock curved surface in step 3 further comprises the steps of:

Step 3-1: making the small shock cone obtained in step 2 intersect with the bottom plane perpendicular to the flow direction, thereby obtaining a series of bottom circles; subsequently, setting the i-th leading-edge discrete point to be $P_i(x_i, y_i, z_i)$, then the radius $r_i$ of the corresponding bottom circle being:

$$r_i = -x_i \tan \beta_i, \quad (1)$$

wherein $x_i$, $y_i$, $z_i$ are the coordinates of the leading-edge discrete point and $\beta_i$ is the shock angle;

Step 3-2: drawing a common tangent circle of each three adjacent bottom circles, wherein the center of the common tangent circle is the curvature center of the approximate conical flow field corresponding to the leading-edge discrete point, and the radius of the common tangent circle is the curvature radius of the approximate conical flow field;

Step 3-3: determining the approximate flow plane corresponding to the i-th leading-edge discrete point according to the i-th leading-edge discrete point, the corresponding common tangent circle center and the bottom circle center;

Step 3-4: connecting the i-th leading-edge discrete point with the tangent point of the corresponding common tangent circle and the bottom circle, thereby obtaining the i-th generatrix of the shock curved surface;

Step 3-5: going through all leading-edge discrete points by repeating steps 3-2 to 3-4, thereby obtaining the centers, radii, and tangent points of all common tangent circles corresponding to all leading-edge discrete points;

Step 3-6: connecting all generatrices obtained in step 3-4 into a ruled surface, namely, the shock curved surface corresponding to the leading edgeleading edge.

In another embodiment of the present invention, in mathematics, drawing a common tangent circle of each three adjacent bottom circles belongs to Apollonius' problem, and the initial equation group is:

$$\begin{cases} (y-y_1)^2 + (z-z_1)^2 = (R-mr_1)^2 \\ (y-y_2)^2 + (z-z_2)^2 = (R-mr_2)^2 \\ (y-y_3)^2 + (z-z_3)^2 = (R-mr_3)^2 \end{cases} \quad (2)$$

wherein when the required shock wave is the outer cone shock wave, m=1, and when the required shock wave is the inner cone shock wave, m=−1, wherein $(y_1, z_1)$, $(y_2, z_2)$ and $(y_3, z_3)$ are respectively the center coordinates of the three bottom circles, wherein y, z is the coordinates of the center of the common tangent circle, wherein $r_1$, $r_2$ and $r_3$ are respectively the radii of the three bottom circles, and R is the radius of the common tangent circle;

For equation (2), intermediate variables $a_2$, $b_2$, $c_2$, $a_3$, $b_3$, $c_3$, $c_{22}$, $c_{32}$ are:

$$\begin{cases} a_2 = y_2 - y_1; a_3 = y_3 - y_1 \\ b_2 = z_2 - z_1; b_3 = z_3 - z_1 \\ c_2 = r_2 - r_1; c_3 = r_3 - r_1 \\ c_{22} = r_2^2 - r_1^2; c_{32} = r_3^2 - r_1^2 \end{cases} \quad (3)$$

after being simplified:

$$\begin{bmatrix} y - y_1 \\ z - z_1 \end{bmatrix} = \frac{-1}{b_3 a_2 - b_2 a_3} \begin{bmatrix} -c_2 b_3 + c_3 b_2 \\ c_2 a_3 - c_3 a_2 \end{bmatrix} mR + \frac{1}{2(b_3 a_2 - b_2 a_3)} \begin{bmatrix} (c_{32} b_2 - c_{22} b_3) + a_2^2 b_3 - a_3^2 b_2 + b_2 b_3 (b_2 - b_3) \\ (-c_{32} a_2 + c_{22} a_3) - b_2^2 a_3 + b_3^2 a_2 - a_2 a_3 (a_2 - a_3) \end{bmatrix} \quad (4)$$

intermediate variables $k_{11}$, $k_{12}$, $k_{12}$, $k_{22}$ are:

$$\begin{cases} k_{11} = \frac{-c_2 b_3 + c_3 b_2}{b_3 a_2 - b_2 a_3} \\ k_{12} = \frac{c_2 a_3 - c_3 a_2}{b_3 a_2 - b_2 a_3} \\ k_{21} = \frac{(c_{32} b_2 - c_{22} b_3) + a_2^2 b_3 - a_3^2 b_2 + b_2 b_3 (b_2 - b_3)}{2(b_3 a_2 - b_2 a_3)} \\ k_{22} = \frac{(-c_{32} a_2 + c_{22} a_3) - b_2^2 a_3 + b_3^2 a_2 - a_2 a_3 (a_2 - a_3)}{2(b_3 a_2 - b_2 a_3)} \end{cases} \quad (5)$$

after being further simplified:

$$\begin{bmatrix} y - y_1 \\ z - z_1 \end{bmatrix} = -\begin{bmatrix} k_{11} \\ k_{12} \end{bmatrix} mR + \begin{bmatrix} k_{21} \\ k_{22} \end{bmatrix} \quad (6)$$

it renders into a quadratic equation of one variable, $$(k_{11}^2 + k_{12}^2 - 1)R^2 - 2m(k_{11}k_{21} + k_{12}k_{22} - r_1)R + (k_{21}^2 + k_{22}^2 - r_1^2) = 0 \quad (7)$$

and R is obtained by solving equation (7);

$$R = \frac{2m(k_{11}k_{21} + k_{12}k_{22} - r_1) \pm \sqrt{4(k_{11}k_{21} + k_{12}k_{22} - r_1)^2 - 4(k_{11}^2 + k_{12}^2 - 1)(k_{21}^2 + k_{22}^2 - r_1^2)}}{2(k_{11}^2 + k_{12}^2 - 1)} \quad (8)$$

subsequently, R obtained by solving equation (8) is put into equation (6) to obtain the corresponding coordinates y, z;

when $b_3 a_2 - b_2 a_3 = 0$, the original equation group degenerates, there is only one R solution, and the expression is:

$$\begin{cases} d_2 = (y_1^2 + z_1^2 - r_1^2) - (y_2^2 + z_2^2 - r_2^2) \\ d_3 = (y_1^2 + z_1^2 - r_1^2) - (y_3^2 + z_3^2 - r_3^2) \\ R = \frac{a_3 d_2 - a_2 d_3}{2m(a_3 c_2 - a_2 c_3)} \end{cases} \quad (9)$$

wherein $d_2$, $d_3$ are intermediate variables, and R is put into the first two equations of equation group (2) to establish a binary quadratic equation group:

$$\begin{cases} (y-y_1)^2 + (z-z_1)^2 = (R-mr_1)^2 \\ (y-y_2)^2 + (z-z_2)^2 = (R-mr_2)^2 \end{cases} \quad (10)$$

subsequently, the two formulas in equation group (10) are subtracted to obtain the expression of y:

$$y = \frac{-d_2 + 2mRc_2 - 2zb_2}{2a_2} \quad (11)$$

and after being simplified:

$$\begin{cases} e_2 = \frac{-d_2 + 2mRc_2}{2a_2} \\ y = -\frac{b_2}{a_2} z + e_2 \end{cases} \quad (12)$$

wherein $e_2$ is an intermediate variable, and (12) is put into the first equation of equation group (10):

$$\left(\frac{b_2^2}{a_2^2} + 1\right) z^2 + 2\left[(y_1 - e_2)\frac{b_2}{a_2} - z_1\right] z + (y_1 - e_2)^2 + z_1^2 - (R - mr_1)^2 = 0 \quad (13)$$

wherein because the coordinate y of each leading-edge discrete point varies, the denominator $a_2$ is always not equal to 0, and when the three leading-edge discrete points are collinear, equation (13) is always true on the leading edge-leading edge; by solving equation (13), the analytical expression of z when the leading-edge discrete points are collinear is obtained:

$$\begin{cases} f_2 = \frac{b_2^2}{a_2^2} + 1 \\ g_2 = 2(y_1 - e_2)\frac{b_2}{a_2} - 2z_1 \\ h_2 = (y_1 - e_2)^2 + z_1^2 - (R - mr_1)^2 \\ z = \frac{-g_2 \pm \sqrt{g_2^2 - 4f_2 h_2}}{2f_2} \end{cases} \quad (14)$$

wherein $f_2$, $g_2$, $h_2$ are intermediate variables, and (14) is put into (12) to obtain the coordinates y, z of the center of the common tangent circle.

For every three bottom circles having two common tangent circles, two solutions are obtained by means of the aforesaid solving process. Under such circumstances, the common tangent circle whose common tangent point is below the leading-edge discrete point is chosen as the common tangent circle.

The aforesaid solving process is performed to all leading-edge discrete points for obtaining the centers, radii, and tangent points of all common tangent circles corresponding to all leading-edge discrete points. Based on the tangent points of the leading-edge discrete point and the corresponding common tangent circle and bottom circle, a generatrix of the shock curved surface is established. After connecting all of the generatrices, the shock curved surface is obtained.

In another embodiment of the present invention, specifically, step 4 further comprises:

Step 4-1: calculating the flow field behind the wave by using the osculating curved surface waverider design method based on the shock wave curved surface obtained in step 3 and the leading edgeleading edge obtained in step 1; specifically, for the convex-shaped shock, calculating by using the outer cone flow field, for the concave-shaped shock wave, calculating by using the inner cone flow field, and for the linear-shaped shock wave, calculating by using the wedge flow field; tracing the flow line by starting from the leading edgeleading edge, thereby obtaining the lower surface of the waverider;

Step 4-2: tracing the flow line of the free inlet by starting from the leading edgeleading edge, thereby obtaining the upper surface of the waverider.

Compared with the prior art, the present invention has the following advantages:

First, the present invention realizes the function of designing a waverider based on a complex shape-leading through obtaining the shock wave curved surface corresponding to the leading edgeleading edge; therefore, through selecting a proper leading edgeleading edge, higher cruise lift-drag ratio and wider application range of the waverider are achieved;

Second, the present invention provides an analytical solution of the relationship between the leading edgeleading edge and the shock wave curved surface. Compared with the method for solving a numerical solution, the present invention achieves higher numerical accuracy and faster calculation speed;

Third, the flow planes corresponding to different portions of the leading edgeleading edge of the present invention may have different shock angles, which is capable of significantly improving the designability of a waverider.

BRIEF DESCRIPTION OF THE DRAWINGS

To clearly describe the embodiments of the present invention or the technical solutions in the prior art, the drawings used in the embodiments are briefly explained in the following. By referring to the drawings, the technical features and benefits of the present invention may be clearly understood. The drawings are schematic drawings and should not be therefore understood as any restriction on the present invention. For those skilled in the art, other drawings may be obtained according to the drawings of the present invention without paying creative labor.

Marking Instructions: 1—Leading-edge, 2—Leading-edge Discrete Point, 3—Small Shock Cone, 4—Bottom Cone, 5—Common Tangent Circle, 6—Shock Curve, 7—Shock Curved Surface.

DETAILED DESCRIPTION

To allow the purposes, features and benefits of the present invention to be better understood, drawings and detailed embodiments are combined hereinafter to elaborate the technical solution of the present invention. It is worth mentioning that the embodiments of the present invention and the technical features in the embodiments may be combined freely when there is no conflict.

The present invention is described below in details for facilitating a full understanding of the present invention. However, the present invention may also be implemented in other ways differing from those described herein. Therefore, the scope of the present invention is not limited by the embodiments described below.

The present invention provides a direct design method for generating an osculating curved waverider based on a complex leading edge. Through adopting the method of the present invention, the shock curved surface generated by a waverider can be determined through a complex leading edgeleading edge corresponding to the waverider, and the aerodynamic corresponding to the leading edgeleading edge can be generated accordingly.

For the osculating cone waverider design method, the osculating inner cone waverider design method and the curved surface waverider design method, the intersection line of the flow plane and the shock curved surface has the following feature in common: the intersection line overlaps a corresponding conical shock micro-surface, which is a generatrix of its corresponding conical shock.

Based on this, a space cone is drawn by starting from the leading edge point determined by the intersection line, taking the direction of the inlet as an axis and taking the shock angle as the half-cone angle, which is called a "small shock cone". Obviously, the axis of the small shock cone is parallel to the axis of a "large shock cone", and both of them are in the direction of the inlet. In addition, the sharp point of the small shock cone is located on the conical surface of the large shock cone, and the cone angle of the small shock cone is equal to that of the large shock cone. Based on the aforesaid geometric conditions, it can be deduced that the small shock cone and the large shock cone are tangent to their intersection line. Further, the circle obtained from the intersection between the small shock cone and the base plane must be tangent to the circle obtained from the intersection between the large shock cone and the base plane. As long as the centers of the two circles are known, the small shock cone which is tangent to the large shock cone can be determined through the large shock cone, and the large shock cone which is tangent to the small shock cone can be restored through the small shock cone.

For the base plane of the waverider, a large number of approximate conical shock waves used in the osculating method intersect with the base plane to generate a large number of circles, and the small shock cone drawn from the leading edgeleading edge intersects with the base plane to produce a large number of circles as well. Based on the aforesaid, the two groups of circles are tangent to each other in one-to-one correspondence, and the envelope lines generated by the two groups of circles based on the tangent points overlap with each other. The obtained envelope line is the shock curve required by the osculating method. Similarly, the envelope surface generated by the small shock cone curved surface is the shock curved surface corresponding to the leading edge.

Figure 1:
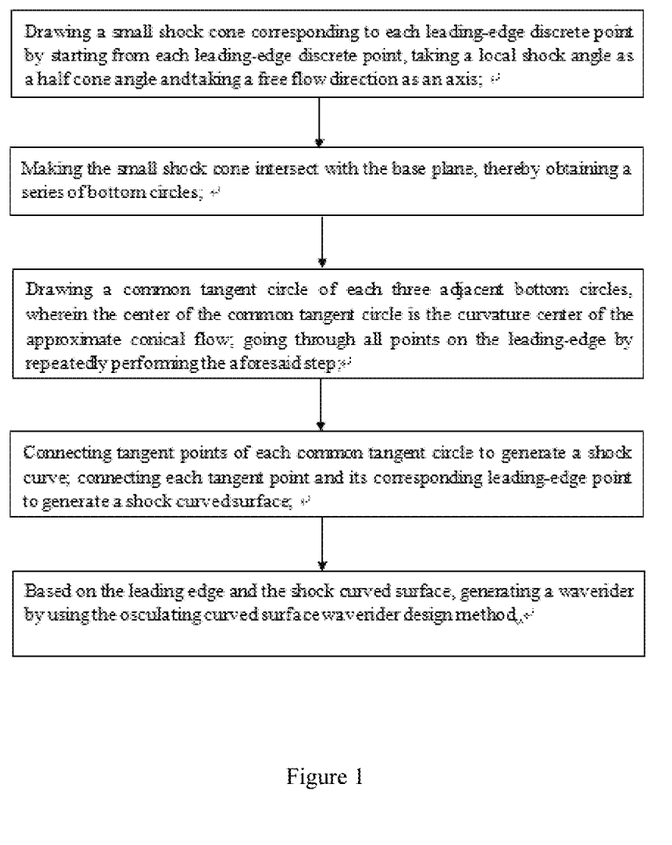
FIG. 1 is a flow chart illustrating the method of the present invention.
Figure 2:
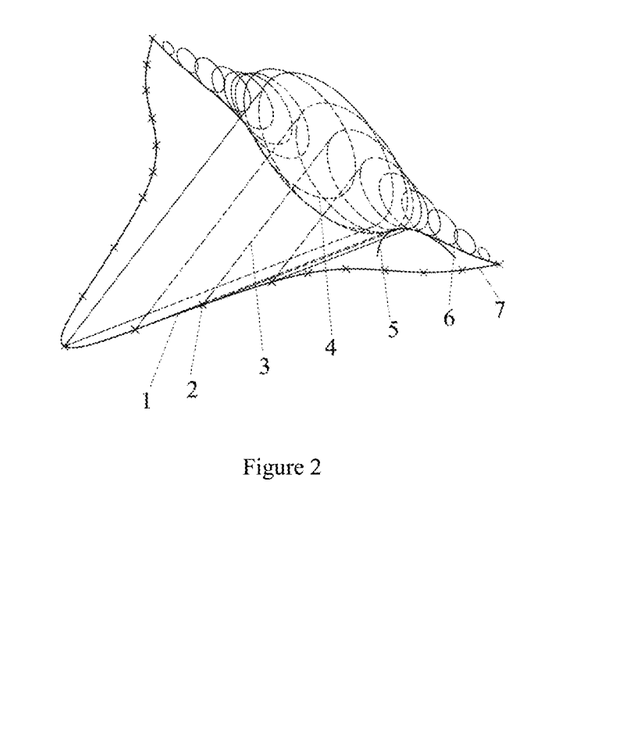
FIG. 2 is a conceptual diagram illustrating the basic principle of the present invention.
Figure 3:
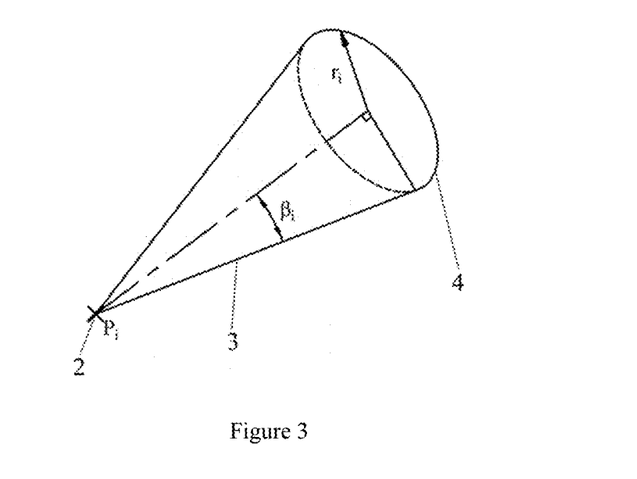
FIG. 3 is a conceptual diagram illustrating an exemplary structure of the small shock cone.
Figure 4:
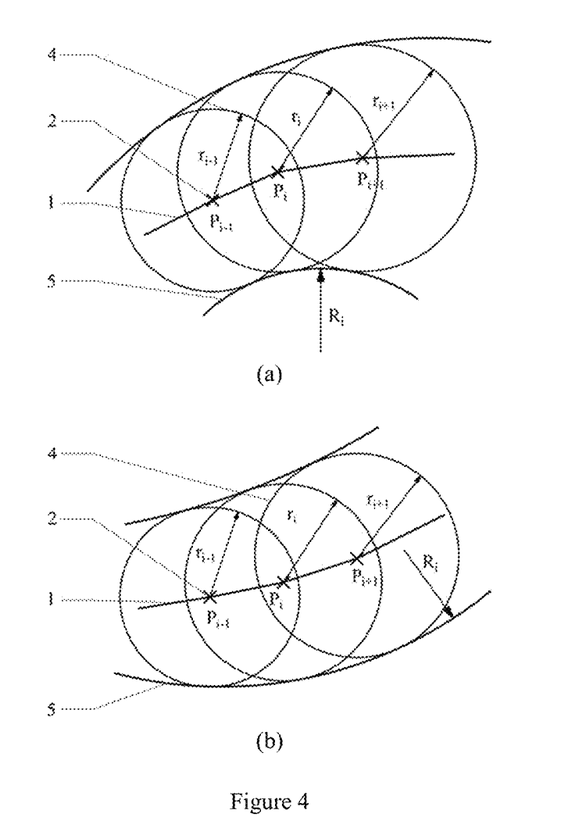
FIG. 4 is a conceptual diagram illustrating the principle of generating a shock curve based on the osculating curved surface waverider direct design method with a given leading edge, wherein in FIG. 4(a), the shock wave corresponding to the leading edge shock wave is an inner cone shock wave, and in FIG. 4(b), the shock wave corresponding to the leading edge shock wave is an outer cone shock wave.

As shown in FIGS. 1-2, a direct design method for generating an osculating curved waverider based on a complex leading edge, comprising the steps of:

Step 1: obtaining a leading edgeleading edge 1 through determining a leading edge of a waverider according to the spread length, the front-to-rear length, and the sweep angle at each position of an aircraft, and arranging leading-edge discrete points 2 on the leading edgeleading edge 1;

Step 2: drawing a small shock cone 3 corresponding to each leading-edge discrete point by starting from each leading-edge discrete point 2, taking a local shock angle as a half cone angle and taking a free streamline direction as an axis; to achieve an easy reading, FIG. 2 merely shows the small shock cone 3 corresponding to a part of the leading-edge discrete points 2. The structure of the small shock cone 3 is shown in FIG. 3;

Step 3: finding the envelope surfaces of all small shock cones 3, namely, the shock curved surface 7 corresponding to the leading edgeleading edge;

Step 4: generating a waverider by using the osculating curved waverider design method;

Specifically, the method for obtaining the shock curved surface in step 3 further comprises the steps of:

Step 3-1: making the small shock cone obtained in step 2 intersect with the bottom plane perpendicular to the flow direction, thereby obtaining a series of bottom circles; subsequently, setting the i-th leading-edge discrete point to be $P_i(x_i, y_i, z_i)$, then the radius $r_i$ of the corresponding bottom circle being:

$$r_i = -x_i \tan \beta_i, \tag{1}$$

wherein $x_i$, $y_i$, $z_i$ are the coordinates of the leading-edge discrete point and $\beta_i$ is the shock angle;

Step 3-2: as shown in FIG. 4, drawing a common tangent circle of each three adjacent bottom circles, wherein the center of the common tangent circle is the curvature center of the approximate conical flow field corresponding to the leading-edge discrete point, and the radius of the common tangent circle is the curvature radius of the approximate conical flow field;

Step 3-3: determining the approximate flow plane corresponding to the i-th leading-edge discrete point according to the i-th leading-edge discrete point, the corresponding common tangent circle center and the bottom circle center;

Step 3-4: connecting the i-th leading-edge discrete point with the tangent point of the corresponding common tangent circle and the bottom circle, thereby obtaining the i-th generatrix of the shock curved surface;

Step 3-5: going through all leading-edge discrete points by repeating steps 3-2 to 3-4, thereby obtaining the centers, radii, and tangent points of all common tangent circles corresponding to all leading-edge discrete points;

Step 3-6: connecting all generatrices obtained in step 3-4 into a ruled surface, namely, the shock curved surface corresponding to the leading edgeleading edge.

Specifically, in mathematics, drawing a common tangent circle of each three adjacent bottom circles belongs to Apollonius' problem, and the initial equation group is:

$$\begin{cases} (y - y_1)^2 + (z - z_1)^2 = (R - mr_1)^2 \\ (y - y_2)^2 + (z - z_2)^2 = (R - mr_2)^2 \\ (y - y_3)^2 + (z - z_3)^2 = (R - mr_3)^2 \end{cases} \tag{2}$$

wherein when the required shock wave is the outer cone shock wave, m=1, and when the required shock wave is the inner cone shock wave, m=−1, wherein $(y_1, z_1)$, $(y_2, z_2)$ and $(y_3, z_3)$ are respectively the center coordinates of the three bottom circles, wherein y, z is the coordinates of the center of the common tangent circle, wherein $r_1$, $r_2$ and $r_3$ are respectively the radii of the three bottom circles, and R is the radius of the common tangent circle;

For equation (2), intermediate variables $a_2$, $b_2$, $c_2$, $a_3$, $b_3$, $c_3$, $c_{22}$, $c_{32}$ are:

$$\begin{cases} a_2 = y_2 - y_1; a_3 = y_3 - y_1 \\ b_2 = z_2 - z_1; b_3 = z_3 - z_1 \\ c_2 = r_2 - r_1; c_3 = r_3 - r_1 \\ c_{22} = r_2^2 - r_1^2; c_{32} = r_3^2 - r_1^2 \end{cases} \tag{3}$$

after being simplified:

$$\begin{bmatrix} y - y_1 \\ z - z_1 \end{bmatrix} = \frac{-1}{b_3 a_2 - b_2 a_3} \begin{bmatrix} -c_2 b_3 + c_3 b_2 \\ c_2 a_3 - c_3 a_2 \end{bmatrix} mR + \tag{4}$$

$$\frac{1}{2(b_3 a_2 - b_2 a_3)} \begin{bmatrix} (c_{32} b_2 - c_{22} b_3) + a_2^2 b_3 - a_3^2 b_2 + b_2 b_3 (b_2 - b_3) \\ (-c_{32} a_2 + c_{22} a_3) - b_2^2 a_3 + b_3^2 a_2 - a_2 a_3 (a_2 - a_3) \end{bmatrix}$$

intermediate variables $k_{11}$, $k_{12}$, $k_{21}$, $k_{22}$ are:

$$\begin{cases} k_{11} = \dfrac{-c_2 b_3 + c_3 b_2}{b_3 a_2 - b_2 a_3} \\ k_{12} = \dfrac{c_2 a_3 - c_3 a_2}{b_3 a_2 - b_2 a_3} \\ k_{21} = \dfrac{(c_{32} b_2 - c_{22} b_3) + a_2^2 b_3 - a_3^2 b_2 + b_2 b_3 (b_2 - b_3)}{2(b_3 a_2 - b_2 a_3)} \\ k_{22} = \dfrac{(-c_{32} a_2 + c_{22} a_3) - b_2^2 a_3 + b_3^2 a_2 - a_2 a_3 (a_2 - a_3)}{2(b_3 a_2 - b_2 a_3)} \end{cases} \quad (5)$$

after being further simplified:

$$\begin{bmatrix} y - y_1 \\ z - z_1 \end{bmatrix} = - \begin{bmatrix} k_{11} \\ k_{12} \end{bmatrix} mR + \begin{bmatrix} k_{21} \\ k_{22} \end{bmatrix} \quad (6)$$

it renders into a quadratic equation of one variable, $$(k_{11}^2 + k_{12}^2 - 1)R^2 - 2m(k_{11}k_{21} + k_{12}k_{22} - r_1)R + (k_{21}^2 + k_{22}^2 - r_1^2) = 0 \quad (7)$$

and R is obtained by solving equation (7);

$$R = \dfrac{2m(k_{11}k_{21} + k_{12}k_{22} - r_1) \pm \sqrt{4(k_{11}k_{21} + k_{12}k_{22} - r_1)^2 - 4(k_{11}^2 + k_{12}^2 - 1)(k_{21}^2 + k_{22}^2 - r_1^2)}}{2(k_{11}^2 + k_{12}^2 - 1)} \quad (8)$$

subsequently, R obtained by solving equation (8) is put into equation (6) to obtain the corresponding coordinates y, z; when $b_3 a_2 - b_2 a_3 = 0$, the original equation group degenerates, there is only one R solution, and the expression is:

$$\begin{cases} d_2 = (y_1^2 + z_1^2 - r_1^2) - (y_2^2 + z_2^2 - r_2^2) \\ d_3 = (y_1^2 + z_1^2 - r_1^2) - (y_3^2 + z_3^2 - r_3^2) \\ R = \dfrac{a_3 d_2 - a_2 d_3}{2m(a_3 c_2 - a_2 c_3)} \end{cases} \quad (9)$$

wherein $d_2$, $d_3$ are intermediate variables, and R is put into the first two equations of equation group (2) to establish a binary quadratic equation group:

$$\begin{cases} (y - y_1)^2 + (z - z_1)^2 = (R - mr_1)^2 \\ (y - y_2)^2 + (z - z_2)^2 = (R - mr_2)^2 \end{cases} \quad (10)$$

subsequently, the two formulas in equation group (10) are subtracted to obtain the expression of y:

$$y = \dfrac{-d_2 + 2mRc_2 - 2zb_2}{2a_2} \quad (11)$$

and after being simplified:

$$\begin{cases} e_2 = \dfrac{-d_2 + 2mRc_2}{2a_2} \\ y = -\dfrac{b_2}{a_2} z + e_2 \end{cases} \quad (12)$$

wherein $e_2$ is an intermediate variable, and (12) is put into the first equation of equation group (10):

$$\left( \dfrac{b_2^2}{a_2^2} + 1 \right) z^2 + 2 \left[ (y_1 - e_2) \dfrac{b_2}{a_2} - z_1 \right] z + (y_1 - e_2)^2 + z_1^2 - (R - mr_1)^2 = 0 \quad (13)$$

wherein because the coordinate y of each leading-edge discrete point varies, the denominator $a_2$ is always not equal to 0, and when the three leading-edge discrete points are collinear, equation (13) is always true on the leading edge-leading edge; by solving equation (13), the analytical expression of z when the leading-edge discrete points are collinear is obtained:

$$\begin{cases} f_2 = \dfrac{b_2^2}{a_2^2} + 1 \\ g_2 = 2(y_1 - e_2) \dfrac{b_2}{a_2} - 2z_1 \\ h_2 = (y_1 - e_2)^2 + z_1^2 - (R - mr_1)^2 \\ z = \dfrac{-g_2 \pm \sqrt{g_2^2 - 4 f_2 h_2}}{2 f_2} \end{cases} \quad (14)$$

wherein $f_2$, $g_2$, $h_2$ are intermediate variables, and (14) is put into (12) to obtain the coordinates y, z of the center of the common tangent circle; For every three bottom circles having two common tangent circles, two solutions are obtained by means of the aforesaid solving process. Under such circumstances, the common tangent circle whose common tangent point is below the leading-edge discrete point is chosen as the common tangent circle.

The aforesaid solving process is performed to all leading-edge discrete points for obtaining the centers, radii, and tangent points of all common tangent circles corresponding to all leading-edge discrete points. Based on the tangent points of the leading-edge discrete point and the corresponding common tangent circle and bottom circle, a generatrix of the shock curved surface is established. After connecting all of the generatrices, the shock curved surface is obtained.

Specifically, step 4 further comprises:

Step 4-1: calculating the flow field behind the wave by using the osculating curved surface waverider design method based on the shock wave curved surface obtained in step 3 and the leading edgeleading edge obtained in step 1; specifically, for the convex-shaped shock, calculating by using the outer cone flow field, for the concave-shaped shock wave, calculating by using the inner cone flow field, and for linear-shaped shock wave, calculating by using the wedge flow field;

Step 4-2: tracing the flow line of the free inlet by starting from the leading edgeleading edge, thereby obtaining the upper surface of the waverider.

To achieve an easy understanding, the aforesaid technical solution is described in details in the following embodiment:

Embodiment 1

Figure 5:
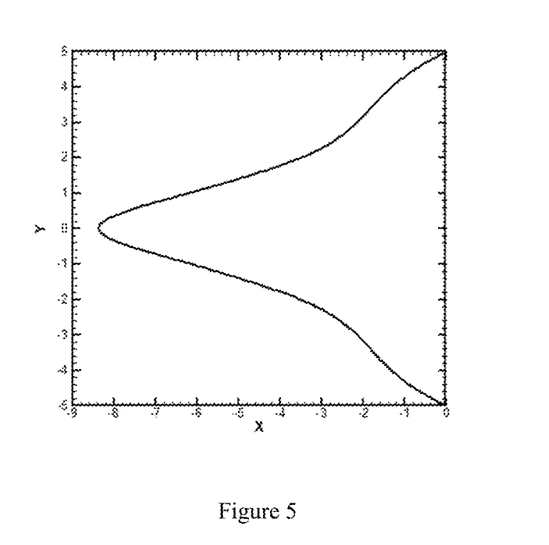
FIG. 5 is a conceptual diagram illustrating the shock form line used in the embodiment.

The method of the present invention is adopted to design a waverider, wherein the leading edgeleading edge is the form line shown in FIG. 5, the inlet Mach number is 6, and the shock angle is 13°. The generated waverider is shown in FIG. 6.

Figure 6:
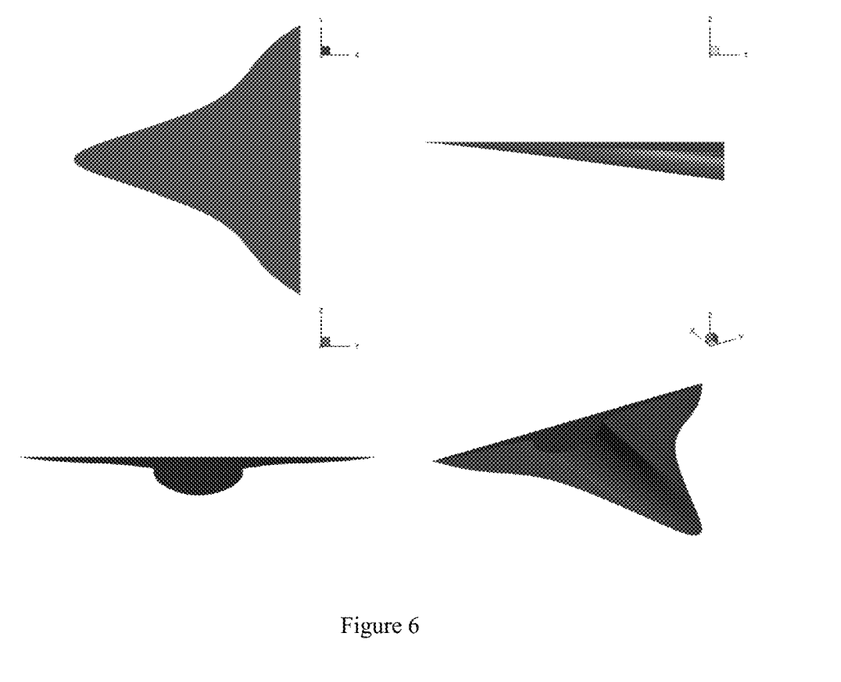
FIG. 6 is a conceptual diagram illustrating the waverider obtained in the embodiment through adopting the method of the present invention.
Figure 7:
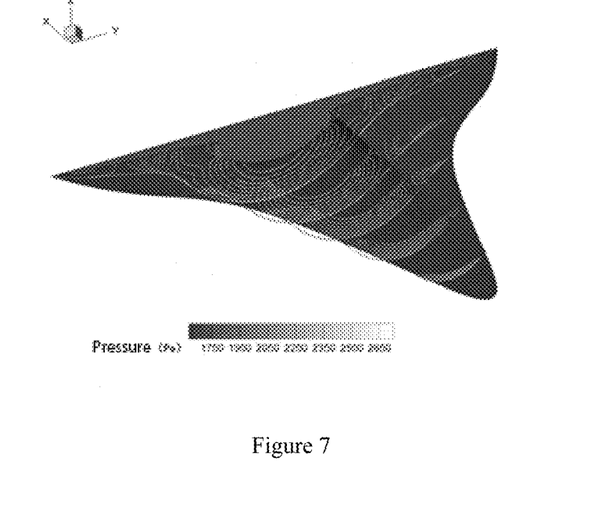
FIG. 7 is a nephogram illustrating the sectional pressure distribution in different flow directions.
Figure 8:
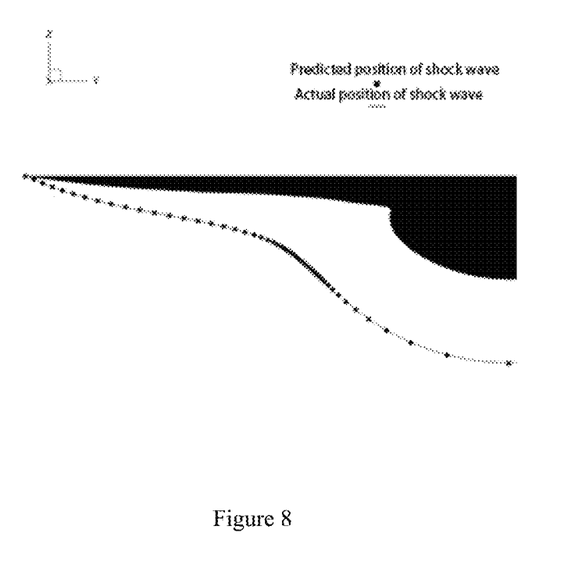
FIG. 8 is a comparison diagram illustrating the expected position of generation and the actual position of presence of the shock wave of the waverider in the embodiment.

To verify the reliability of the design method of the present invention, numerical simulation is performed for testing the shown in FIG. 6. In the simulation, the inlet Mach number is 6, the height is 30 km (kilometers), and the flow is inviscid. The test results obtained in the numerical simulation are shown in FIGS. 7 and 8. FIG. 7 is a nephogram illustrating the sectional pressure distribution in different flow directions. According to the test results, through adopting the method of the present invention, the obtained waverider satisfies the requirement of the leading edgeleading edge while possessing the properties of a waverider. Therefore, the method of the present invention wholly meets the use requirements. FIG. 8 shows the expected position of generation and the actual position of presence of the shock wave of the waverider designed through adopting the method of the present invention. It can be seen that the expected position and the actual position are highly consistent, which proves that the method of the present invention realizes the design of the waverider based on the leading edgeleading edge and achieves high design accuracy.

The above are merely the preferred embodiments of the present invention and are not used to limit the present invention. For those skilled in the art, various modifications and alterations may be made to the present invention. Therefore, any modifications, equivalent replacements and improvements made within the spirit and principles of the present invention shall fall into the scope defined by the claims of the present invention.

The invention claimed is:

1. A direct design method for generating an osculating curved waverider based on a complex leading edge, comprising:

step 1: obtaining a leading edge through determining a leading edge of a waverider according to a spread length, a front-to-rear length, and a sweep angle at each position of an aircraft, and arranging leading-edge discrete points on the leading edge;

step 2: drawing a shock cone corresponding to each leading-edge discrete point by starting from each leading-edge discrete point, taking a local shock angle as a half cone angle and taking a free streamline direction as an axis;

step 3: finding envelope surfaces of all shock cones, namely, a shock curved surface corresponding to the leading edge;

wherein the method for obtaining the shock curved surface in step 3 further comprising:

step 3-1: making the shock cone obtained in step 2 intersect with a bottom plane perpendicular to the flow direction, thereby obtaining a series of bottom circles: subsequently setting a i-th leading-edge discrete point to be $P_i$ ($x_i$, $y_i$, $z_i$), then a radius $r_i$ of the corresponding bottom circle being:

$$r_i = -x_i \tan \beta_i, \quad (1),$$

wherein $x_i$, $y_i$, $z_i$ are the coordinates of the leading-edge discrete point and $\beta_i$ is the shock angle;

step 3-2: drawing a common tangent circle of each three adjacent bottom circles, wherein center of the common tangent circle is a curvature center of an approximate conical flow field corresponding to the leading-edge discrete point, and a radius of the common tangent circle is a curvature radius of the approximate conical flow field;

step 3-3: determining the approximate flow plane corresponding to the i-th leading-edge discrete point according to the i-th leading-edge discrete point, the corresponding common tangent circle center and the bottom circle center;

step 3-4: connecting the i-th leading-edge discrete point with the tangent point of the corresponding common tangent circle and the bottom circle, thereby obtaining the i-th generatrix of the shock curved surface;

step 3-5: going through all leading-edge discrete points by repeating steps 3-2 to 3-4 thereby obtaining the centers, radii, and tangent points of all common tangent circles corresponding to all leading-edge discrete points;

step 3-6: connecting all generatrices obtained in step 3-4 into a ruled surface, namely, the shock curved surface corresponding to the leading edge;

step 4: generating a waverider by using the osculating curved waverider design method;

wherein in mathematics, drawing a common tangent circle of each three adjacent bottom circles belongs to Apollonius' problem, and the initial equation group is:

$$\begin{cases} (y - y_1)^2 + (z - z_1)^2 = (R - mr_1)^2 \\ (y - y_2)^2 + (z - z_2)^2 = (R - mr_2)^2 \\ (y - y_3)^2 + (z - z_3)^2 = (R - mr_3)^2 \end{cases} \quad (2)$$

wherein when the required shock wave is an outer cone shock wave, m=1, and when the required shock wave is an inner cone shock wave, m=−1, wherein ($y_1$, $z_1$), ($y_2$, $z_2$) and ($y_3$, $z_3$) are respectively center coordinates of the three bottom circles, wherein y, z are the coordinates of the center of the common tangent circle, wherein $r_1$, $r_2$ and $r_3$ are respectively radii of the three bottom circles, and R is the radius of the common tangent circle, wherein for equation (2), intermediate variables $a_2$, $b_2$, $c_2$, $c_3$, $b_3$, $c_3$, $c_{22}$, $c_{32}$ are:

$$\begin{cases} a_2 = y_2 - y_1; a_3 = y_3 - y_1 \\ b_2 = z_2 - z_1; b_3 = z_3 - z_1 \\ c_2 = r_2 - r_1; c_3 = r_3 - r_1 \\ c_{22} = r_2^2 - r_1^2; c_{32} = r_3^2 - r_1^2 \end{cases} \quad (3)$$

after being simplified:

$$\begin{bmatrix} y - y_1 \\ z - z_1 \end{bmatrix} = \frac{-1}{b_3 a_2 - b_2 a_3} \begin{bmatrix} -c_2 b_3 + c_3 b_2 \\ c_2 a_3 - c_3 a_2 \end{bmatrix} mR + \quad (4)$$

$$\frac{1}{2(b_3 a_2 - b_2 a_3)} \begin{bmatrix} (c_{32} b_2 - c_{22} b_3) + a_2^2 b_3 - a_3^2 b_2 + b_2 b_3 (b_2 - b_3) \\ (-c_{32} a_2 + c_{22} a_3) - b_2^2 a_3 + b_3^2 a_2 - a_2 a_3 (a_2 - a_3) \end{bmatrix}$$

intermediate variables $k_{11}$, $K_{12}$, $K_{21}$, $K_{22}$ are:

$$\begin{cases} k_{11} = \dfrac{-c_2 b_3 + c_3 b_2}{b_3 a_2 - b_2 a_3} \\ k_{12} = \dfrac{c_2 a_3 - c_3 a_2}{b_3 a_2 - b_2 a_3} \\ k_{21} = \dfrac{(c_{32} b_2 - c_{22} b_3) + a_2^2 b_3 - a_3^2 b_2 + b_2 b_3 (b_2 - b_3)}{2(b_3 a_2 - b_2 a_3)} \\ k_{22} = \dfrac{(-c_{32} a_2 + c_{22} a_3) - b_2^2 a_3 + b_3^2 a_2 - a_2 a_3 (a_2 - a_3)}{2(b_3 a_2 - b_2 a_3)} \end{cases} \quad (5)$$

after being further simplified:

$$\begin{bmatrix} y - y_1 \\ z - z_1 \end{bmatrix} = -\begin{bmatrix} k_{11} \\ k_{12} \end{bmatrix} mR + \begin{bmatrix} k_{21} \\ k_{22} \end{bmatrix} \quad (6)$$

it renders into a quadratic equation of one variable, $$(k_{12}^2+k_{12}^2-1)R^2-2m(k_{11}k_{21}+k_{12}k_{22}-r_1)R+(k_{21}^2+k_{22}^2-r_1^2)=0 \quad (7)$$

and R is obtained by solving equation (7);

$$R = \frac{2m(k_{11}k_{21}+k_{12}k_{22}-r_1) \pm \sqrt{4(k_{11}k_{21}+k_{12}k_{22}-r_1)^2 - 4(k_{11}^2+k_{12}^2-1)(k_{21}^2+k_{22}^2-r_1^2)}}{2(k_{11}^2+k_{12}^2-1)} \quad (8)$$

subsequently, R obtained by solving equation (8) is put into equation (6) to obtain the corresponding coordinates y, z, wherein when $b_3a_2-b_2a_3=0$, the original equation group degenerates, there is only one R solution, and the expression is:

$$\begin{cases} d_2 = (y_1^2+z_1^2-r_1^2)-(y_2^2+z_2^2-r_2^2) \\ d_3 = (y_1^2+z_1^2-r_1^2)-(y_3^2+z_3^2-r_3^2) \\ R = \frac{a_3d_2-a_2d_3}{2m(a_3c_2-a_2c_3)} \end{cases} \quad (9)$$

wherein $d_2$, $d_3$ are intermediate variables, and R is put into the first two equations of equation group (2) to establish a binary quadratic equation group:

$$\begin{cases} (y-y_1)^2+(z-z_1)^2 = (R-mr_1)^2 \\ (y-y_2)^2+(z-z_2)^2 = (R-mr_2)^2 \end{cases} \quad (10)$$

subsequently, the two formulas in equation group (10) are subtracted to obtain the expression of y:

$$y = \frac{-d_2+2mRc_2-2zb_2}{2a_2} \quad (11)$$

and after being simplified:

$$\begin{cases} e_2 = \frac{-d_2+2mRc_2}{2a_2} \\ y = -\frac{b_2}{a_2}z+e_2 \end{cases} \quad (12)$$

wherein $e_2$ is an intermediate variable, and (12) is put into the first equation of equation group (10):

$$\left(\frac{b_2^2}{a_2^2}+1\right)z^2+2\left[(y_1-e_2)\frac{b_2}{a_2}-z_1\right]z+(y_1-e_2)^2+z_1^2-(R-mr_1)^2=0 \quad (13)$$

wherein because coordinate y of each leading-edge discrete point varies, the denominator $a_2$ is always not equal to 0, and when the three leading-edge discrete points are collinear, equation (13) is always true on the leading edge, wherein by solving equation (13), the analytical expression of z when the leading-edge discrete points are collinear is obtained:

$$\begin{cases} f_2 = \frac{b_2^2}{a_2^2}+1 \\ g_2 = 2(y_1-e_2)\frac{b_2}{a_2}-2z_1 \\ h_2 = (y_1-e_2)^2+z_1^2-(R-mr_1)^2 \\ z = \frac{-g_2 \pm \sqrt{g_2^2-4f_2h_2}}{2f_2} \end{cases} \quad (14)$$

wherein $f_2$, $g_2$, $h_2$ are intermediate variables, and (14) is put into (12) to obtain the coordinates y, z of the center of the common tangent circle, wherein when two solutions are obtained by means of the aforesaid solving process for every three bottom circles having two common tangent circles, the common tangent circle whose common tangent point is below the leading-edge discrete point is chosen as the common tangent circle, wherein the aforesaid solving process is performed to all leading-edge discrete points for obtaining the centers, radii, and tangent points of all common tangent circles corresponding to all leading-edge discrete points, wherein based on the tangent points of the leading-edge discrete point and the corresponding common tangent circle and bottom circle, a generatrix of the shock curved surface is established, and after connecting all of the generatrices, the shock curved surface is obtained.

2. The direct design method for generating an osculating curved waverider based on a complex leading edge of claim 1, wherein step 4 further comprises:

step 4-1: calculating a flow field behind a wave by using the osculating curved surface waverider design method based on the shock wave curved surface obtained in step 3 and the leading edge obtained in step 1; for a convex-shaped shock, calculating by using an outer cone flow field, for a concave-shaped shock wave, calculating by using an inner cone flow field, and for a linear-shaped shock wave, calculating by using an wedge flow field; tracing a flow line by starting from the leading edge, thereby obtaining a lower surface of the waverider;

step 4-2: tracing a flow line of a free inlet by starting from the leading edge, thereby obtaining an upper surface of the waverider.

* * * * *